Oct. 16, 1962 H. W. WESTEREN Re. 25,261

RESISTANCE HEATING ELEMENT FOR VACUUM FURNACES AND THE LIKE

Original Filed Nov. 26, 1957

2 Sheets-Sheet 1

INVENTOR.
Herbert W. Westeren
BY Elliot A. Salter
Attorney.

RESISTANCE HEATING ELEMENT FOR VACUUM FURNACES AND THE LIKE

Original Filed Nov. 26, 1957 2 Sheets-Sheet 2

INVENTOR.
Herbert W. Westeren
BY Elliot A. Salter
Attorney.

United States Patent Office

Re. 25,261
Reissued Oct. 16, 1962

25,261

RESISTANCE HEATING ELEMENT FOR VACUUM FURNACES AND THE LIKE

Herbert W. Westeren, Barrington, R.I., assignor to C. I. Hayes, Inc., a corporation of Rhode Island Original No. 2,971,039, dated Feb. 7, 1961, Ser. No. 699,015, Nov. 26, 1957. Application for reissue Nov. 28, 1961, Ser. No. 155,898
5 Claims. (Cl. 13—25)

Matter enclosed in heavy brackets [ ] appears in the original patent but forms no part of this reissue specification; matter printed in italics indicates the additions made by reissue.

The instant invention relates generally to heat treatment furnaces and, more particularly, to heat treatment furnaces of the high-vacuum type.

A primary object of the instant invention is the provision of a novel and improved resistance heating element specifically designed for use and operation in the so-called cold-wall type of vacuum furnace wherein the heating element is positioned within the high-vacuum chamber.

Another important object of my invention is the provision of a resistance heating element of the character described which will effectively operate on a relatively low electrical potential.

Another object is the provision of a resistance heating element having a maximum heat transmitting surface and so constructed as to provide rapid and uniform heating.

A further object of my invention is the provision of a novel and improved resistance heating element for vacuum furnaces of the cold-wall type, which heating element enables a complete and effective reflective shield to be employed.

Still another object of the instant invention is the provision of a resistance heating element of the character described having a complete and effective reflective shield, the latter of which may be easily removed from the furnace for cleaning and the like.

A further object is the provision of a resistance heating element which in itself is readily removable from the furnace without the necessity of disrupting the terminal lead connections which are employed for feeding current to the unit.

It is also an object of my invention to provide a resistance heating element which is of rugged and durable construction so as to be self-supporting, whereby to eliminate the necessity of using any refractory or other electrical insulation material within the vacuum chamber.

Other objects, features and advantages of the invention will become apparent as the description thereof proceeds when considered in connection with the accompanying illustrative drawings.

In the drawings which illustrate the best mode presently contemplated by me for carying out my invention:

It has been found desirable to provide a novel and improved resistance heating element for a high-vacuum heat treatment furnace of the cold-wall type. Since heat transfer in a vacuum is accomplished by radiation and since the rate of heat transfer is directly affected by the area of heat transmitting surface, it has first of all been found desirable to provide a resistance heating element having a maximum radiating surface. In addition, since it is well known that the presence of refractory within a vacuum chamber makes effective vacuumizing of the chamber more difficult, and since refractory or any other electrical insulation may become a conductor due to deposits or contamination thereon resulting from vaporization of portions of the work load being heat treated in a high vacuum, the instant invention provides a resistance heating element so constructed as to be self-supporting whereby to eliminate the necessity of utilizing refractory or other electrical insulation within the vacuum chamber. In addition, the relatively heavy construction of the heating elements hereinafter to be described enables the desired heat to be obtained by application of a relatively low electrical potential since the heating elements present a low electrical resistance to the electric current being supplied thereto. The use of a low electrical potential greatly reduces the likelihood of undesirable ionization occurring within the vacuum chamber.

In addition to the above features, the instant invention enables a more complete and effective reflective shield to be utilized, it being apparent that the efficiency of the entire furnace is closely tied in with the effectiveness of the heat baffles which are employed. Also, as will hereinafter become apparent, the instant arrangement enables both the heating element and the reflective shield to be readily removed from the furnace for cleaning or repairs with a minimum of difficulty.

Figures 1, 2:
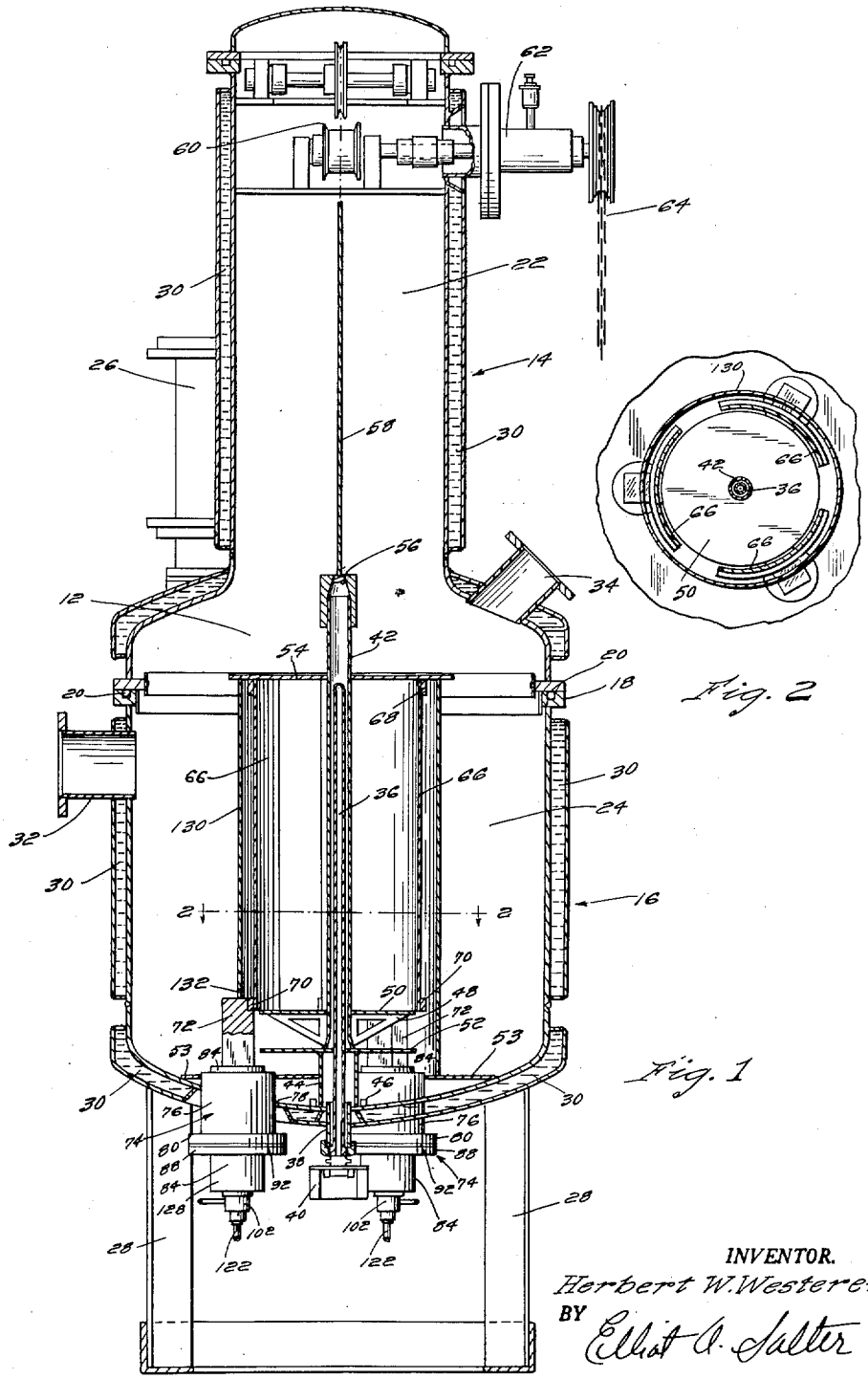
FIG. 1 is an elevational view, in section, of a high-vacuum cold-wall furnace embodying the instant invention.
FIG. 2 is a section taken on line 2—2 of FIG. 1.

Referring now to the drawings, and more particularly to FIG. 1 thereof, there is shown generally at 10 a high-vacuum heat treatment furnace of the cold-wall type. The furnace 10 comprises a pressure vessel 12 having an upper section 14 and a lower section 16. It will be understood that pressure vessel 12 is constructed so as to withstand atmospheric pressure with a minimum of leakage while operating at a high vacuum, and preferably, the said vessel is constructed of nickel-clad steel. As will be noted, the upper section 14 and the lower section 16 are maintained in tight engagement as at 18, by any desirable means, to provide a vacuum tight seal; and in order to further insure the effectiveness of this seal, an O ring 20 is provided intermediate the two sections. Upper section 14 actually defines a cooling chamber 22, it being noted that the said cooling chamber is of reduced diameter with respect to lower section 16, the latter of which defines a heating chamber 24.

Hydraulic lifting mechanism 26 is secured to the furnace upper section 14 and is adapted to raise the said upper section from its engagement with lower section 16. Once so raised, the upper section 14 is adapted to be swung away from the axis of the lower section by means of a pivotal mounting (not shown) in order that the furnace may be loaded in a manner hereinafter to be more clearly described. Supporting braces or standards 28 are secured to lower section 16 for mounting the furnace 10 in its normal, upright position.

As will be clearly seen, both the upper section 14, and the lower section 16 are substantially completely enclosed by a water jacket 30 in order to maintain the outer furnace wall cool for safer handling of the apparatus and for more rapid cooling of the heating chamber when desired. It will be noted that the water jacket 30 does not cover any of the welds in the vacuum chamber wall, the reason for this being that if a leak should develop at one of these welds, water would immediately flow into the furnace if the water jacket did cover the said welds. Also, the absence of a water jacket over the welds enables any leaks which are found to exist to be more easily repaired.

A conventional vacuum pumping port 32 is provided adjacent the upper extremity of lower section 16, while a sight port 34 is provided adjacent the lower extremity of section 14. It will be understood that suction is applied to the port 32 when it is desired to evacuate the vessel 12, while port 34 simply provides a viewing aperture through which the interior of lower section 16 may be readily seen from outside the furnace.

Extending upwardly from the bottom of lower section 16 and centrally positioned within the heating chamber 24 is an elongated thermocouple 36, it being understood that the said thermocouple extends through the furnace wall by means of a vacuum-tight connector 38 mounted on a bracket 40 carried by the framework 28. Telescopingly mounted over thermocouple 36 is an elongated, hollow shaft 42 having an enlarged base portion 44 which when in its lowermost position, as illustrated in FIG. 1, covers the connector 38, and which is maintained in its centrally disposed position by means of positioning lugs 46. As will be noted, rod 42 carries a work tray or pedestal 48, the upper surface 50 of which is preferably of reflective material whereby to maintain the heat centralized within the chamber 24 as much as possible. An additional radiation shield or reflective baffle 52 is mounted just below pedestal 48 on the rod 42, and still another shield 53 spans the bottom of chamber 24 whereby to provide additional heat baffles. Likewise, an upper baffle 54 is slidingly mounted on rod 42 adjacent its upper extremity whereby to prevent the heat from traveling upwardly into cooling chamber 22.

Rod 42, at its upper extremity 56, is secured to a cable 58, which cable is adapted to be taken up by a hand-driven winch 60 located in the upper portion of cooling chamber 22 and extending through a rotary vacuum seal 62 in the wall thereof for exterior operation as at 64. Thus, when winch 60 is operated, rod 42 may be raised into cooling chamber 22 carrying with [its] *it* pedestal 48, baffle 52, and any work load or basket (not shown) which may have been deposited on the surface 50. As will be apparent, the thermocouple 36 will function as aligning means for maintaining the work load properly centered during its ascent, while at the same time the thermocouple enables the temperature of the heating chamber to be readily ascertained.

Figure 3:
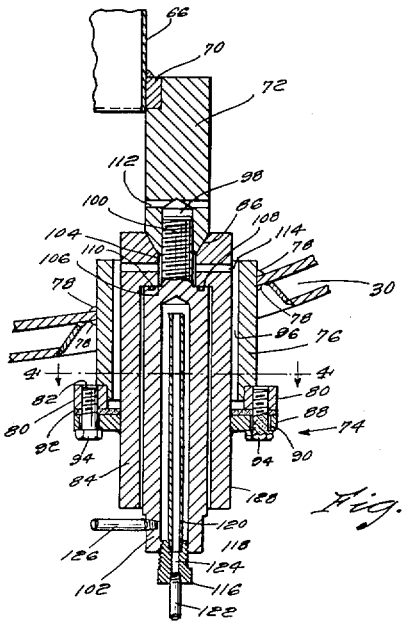
FIG. 3 is an elevational section, on an enlarged scale, of the terminal connection which forms a part of the instant invention.
Figure 4:
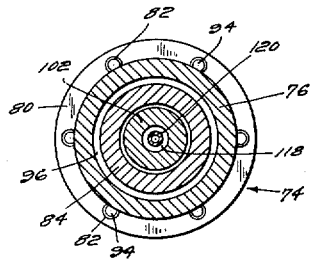
FIG. 4 is a section taken on line 4—4 of FIG. 3.
Figure 5:
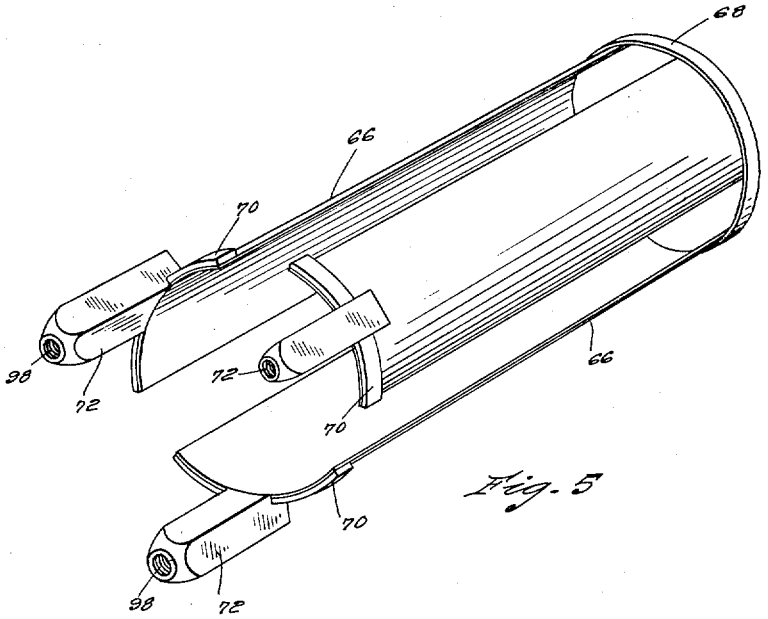
FIG. 5 is a perspective detail, on an enlarged scale, of the resistance heating element per se.

The heating unit which forms a salient part of the instant invention comprises three identical grid members 66, each constructed of an alloy which is substantially 50 percent nickel and 50 percent iron. As will be seen most clearly in FIGS. 2 and 5, the grid members are assembled in substantially cylindrical form and are connected at one end by an iron conductor ring 68 welded to the grid ends so as to form a good electrical connection. At their opposite ends, each grid 66 is provided with an iron segment 70, each of said segments having secured thereto, as by welding, an iron terminal member 72. Each of the terminals 72 is provided with a mounting assembly generally designated at 74, note FIG. 3. The assembly 74 comprises an outer cylinder 76 extending through the bottom wall of lower section 16 and secured thereto by a vacuum-tight weld as at 78. An outwardly extending flange 80 is secured to said cylinder by welding or the like and is provided with threaded apertures 82. An inner cylinder 84 having a conical upper seat 86 is adapted to be mounted within the cylinder 76 in spaced relation thereto. More specifically, the cylinder 84 is provided with an outwardly extending flange 88, which flange is provided with an opening 90 therethrough, said opening 90 being in substantial alignment with the afore-described threaded opening 82 in the flange 80. An insulating gasket 92 is positioned between the flanges 80 and 88, and bolts 94 of electrical insulating material are then utilized to clamp the said flanges 80 and 88 together as shown most clearly in FIG. 3. As will be obvious, the cylinders 76 and 84 are completely insulated from each other from an electrical standpoint, first of all, because their flanges are separated from each other by an insulating gasket 92 and are interconnected by insulated bolts 94, and secondly, because the walls of said cylinders are spaced from each other as at 96.

A threaded opening 98 is provided in the lower extremity of each terminal 72 for receiving the threaded extension 100 of hollow shoulder bolts 102. As will be noted, the threaded extension 100 extends through a specially provided opening 104 in the upper portion of cylinder 84, and upon being tightly threaded within the opening 98, the upper shoulder 106 of the bolt 102 is tightly drawn against surface 108 of the cylinder 84 to provide a vacuum seal therewith. To further insure the effectiveness of this seal, an O ring 110 is positioned between the surfaces 106 and 108. Vent passages 112 and 114 are provided in communication with the openings 98 and 104, respectively, in order to enable any air which may be trapped in these openings to be readily evacuated when suction is applied to port 32 for vacuumizing the pressure vessel.

The bolt 102 is preferably water cooled by means of a plug 116 which is adapted to be threaded into the open end of bore 118, the said plug carrying an upwardly extending open-ended plastic tube 120. As will be noted, plug 116 threadedly receives a tube 122, which tube is in communication with the interior of tube 120 by means of opening 124 provided in the plug 116. A second tube 126 is threadedly received in the wall of bolt 102 and is in communication with bore 118 whereupon a cooling liquid may be continuously circulated through the interior of the bolt 102, it being immaterial whether the fluid enters through tube 122 or 126. Heavy block terminals (not shown) are secured to the lower portion of the cylinders 84 as as 128 whereby electrical current being fed through the said terminals will pass upwardly through cylinder 84 to terminal 72 and thence to segment 70 and grid 66. In order to insure good electrical contact between terminal 72 and cylinder 84, the mating conical surfaces of these elements are preferably silver plated.

As will be obvious, the afore-described terminal arrangement and assembly enables an electric current to be fed to the grids 66 while at the same time maintaining complete insulation with the chamber per se. Since the entire unit is insulated from ground, and since the terminals, segments and grids are spaced from any interior components, such as baffles, etc., there is little likelihood of a short circulit developing due to multiple grounding. This means that no refractory or other electrical insulation is necessary within the heating chamber, a highly desirable feature since refractory is not only difficult to effectively vacuumize, but also when working in high vacuums and at high temperatures it is possible that deposits or contaminations which are likely to result from vaporization of portions of the work load may cause the insulator to become a conductor hence making short circuiting likely.

In addition to the foregoing, the above-described terminal arrangement is further advantageous in that it enables the heating unit to be removed as a unit without the necessity of separating and removing the heavy terminal blocks from their connections to the cylinders 84. In other words, whenever it is desired to remove the heating unit, it is simply necessary to unscrew the shoulder bolt 102 whereupon the heating elements with their terminals 72 are free for removal as a unit, there being no necessity whatsoever for disrupting the terminal connection to the cylinders 84.

The heating unit has been specifically designed to provide high power output at low voltage, which, as afore-described, is advantageous in high vacuum applications since short circuits can be effected when working at high voltages due to ionization. Since high power output is more economically utilized by a three-phase system the [grid] *grids* 66 have been arranged in cylindrical form so as to provide three equal resistances with one end of the cylindrically formed grids connected together by the conductor ring 68 and with the opposite ends thereof provided with terminals 72 rigidly secured to the grid ends by means of the segments 70. As will be apparent, there is one terminal for each phase, and hence, when an A.-C. three-phase electrical current is fed to the said terminals, the grids, segments and ring will heat to approximately the same temperature thereby insuring relatively uniform heating through the overall unit. This uniformity of heating is achieved due to the fact that the electrical resistance throughout every portion of each of the grids is uniform, and since the grids, segments and ring are constructed of relatively heavy material, they afford a low electrical resistance to the electric current passing therethrough, thereby enabling the desired heat to be generated at relatively low voltages. In addition, the rigidity and ruggedness of the heating unit enables it to be self-supporting, which, of course, means that no refractory or other electrical insulation material need be used to support the unit. As hereinbefore indicated, this is a highly desirable feature of the instant arrangement.

As will be seen most clearly in FIG. 1, the grids 66 closely surround any work that is supported on the pedestal 48 and are spaced from said pedestal sufficiently for the latter to freely move upwardly when raised by the winch 60. As will be apparent, the cylindrical arrangement of the flat sheet-like grids affords a maximum heat transfer surface, and in addition, this particular arrangement enables a complete and effective reflective shield or baffle 130 to surround the heating unit. As will be obvious, baffle 130 is nothing more than a straight cylinder having a highly reflective surface, which is freely mounted on horizontal baffle 53, it being understood that notches 132 are provided for clearing the terminals 72 so that the said terminals and shield 130 do not come in contact with each other. As will be apparent, baffle 130 will function in cooperation with the afore-described reflective surfaces 50, 52, 53 and 54, to effectively and tightly maintain the heat generated in the grids 66 within the treatment area. In addition, the baffles may easily be removed for cleaning or repairs whenever desired.

To load the furnace 10, the pedestal 48 is raised to the upper section 14 after which the latter is raised from lower section 16 by means of the hydraulic lifting mechanism 26. Once so raised, upper section 14 is pivotally swung away from the axis of the lower section, and the pedestal 48 is then lowered. The work tray or work load is then placed on surface 50 of the pedestal 48, and the pedestal is then once again raised so that the work is completely encased within chamber 22. The upper section is then swung back into position, lowered into engagement with the lower section, and the work is then lowered so as to be positioned within the heating unit as per the position of the parts illustrated in FIG. 1. Once the work has been heat treated, the pedestal 48 is again raised into chamber 22, which chamber functions as a cooling area. It will be noted that when the pedestal 48 has been raised into chamber 22, the lower baffle 52 will function to prevent any heat which passes upwardly from the grid 66 from entering the said chamber 22.

Thus, it will be seen that there has been provided in accordance with the instant invention a high-vacuum heat treatment furnace having a highly novel and greatly improved heating element. The instant arrangement enables a high degree of heat to be obtained at a relatively low electrical potential and further results in a highly uniform heating arrangement. In addition, the heating element may be more effectively baffled, which is a highly important feature. Also, since the heating unit is self-supporting no refractory or other electrical insulation need be employed within the vacuum chamber.

While there is shown and described herein certain specific structure embodying the invention, it will be manifest to those skilled in the art that various modipcations and rearrangements of the parts may be made without departing from the spirit and scope of the underlying inventive concept and that the same is not limited to the particular forms herein shown and described except insofar as indicated by the scope of the appended claims.

I claim:

1. A resistance heating element for vacuum furnaces and the like, comprising at least three elongated grid members that are spaced from each other to define a cylindrically arranged structure, a conductor element interconnecting one end of said grid members, said grid members thereby being insulated from each other throughout the length thereof except at their interconnected ends, and means operatively engaging each of said grid members at the insulated end thereof for feeding electric current thereto, said electric current feeding means including an electrically conductive segment bar secured to the insulated end of each grid member and extending the width thereof, the cross section of said segment bars being greater than the cross section of said grid members, wherein the electrical resistance of said segment bars is lesser than that of said grid members, so that current introduced into said segment bars will flow evenly therethrough to provide an even distribution of current throughout the length of said grid members, a terminal member secured to each segment bar, and a current carrying element engaging each of said terminal members.

2. A resistance heating element for vacuum furnaces and the like, comprising a plurality of elongated grid members that are spaced from each other to define an open-ended cylindrically arranged structure, means interconnecting one end of said grid members and defining a conductor element, said grid members thereby being insulated from each other throughout the length thereof, except at their interconnected ends, each of said grid members including a segment bar joined to the insulated end thereof, said segment bars being constructed and arranged to transfer an even distribution of current throughout the length of said grid members, and means operatively connected to said segment bars for feeding electric current thereto.

3. A resistance heating element for vacuum furnaces and the like, comprising a plurality of elongated arcuate shaped grid members that are circumferentially spaced from each other to define an open-ended cylindrically arranged structure, said grid members being interconnected at one end by a conductor ring and being insulated from each other except at their interconnected ends, each of said grid members having a segment bar joined to the insulated end thereof, the cross section of said segment bars being greater than the cross section of said grid members wherein the electrical resistance of said segment bars is less than that of said grid members, so that current introduced into said segment bars will flow evenly therethrough to provide an even distribution of current throughout the length of said grid members, and means connected to each of said segment bars for feeding electric current thereto.

*4. A resistance heating element for vacuum furnaces and the like, comprising a plurality of spaced individual grid members, a conductor element extending across one end of said grid members so as to interconnect same, said grid members being insulated from each other except for the connection effected by said conductor element, each of said grid members including a segment bar joined to and extending across the other end thereof, said segment bars being parallel to said conductor element so as to transfer an even distribution of current through each of said grid members, and means operatively connected to said segment bars for feeding electric current thereto.*

*5. A resistance heating element for vacuum furnaces and the like, comprising a plurality of spaced individual grid members, a conductor element extending across one end of said grid members so as to interconnect same, said grid members being insulated from each other except for the connection effected by said conductor element, each of said grid members including a segment bar joined to and extending across the other end thereof, said segment bars being parallel to said conductor element and having*

*a greater cross section than that of said grid members, wherein the electrical resistance of said segment bars is less than that of said grid members, so that current introduced into said segment bars will flow evenly therethrough to provide an even distribution and transfer of current throughout each grid member, and means connected to each of said segment bars for feeding electric current thereto.*

References Cited in the file of this patent or the original patent

UNITED STATES PATENTS

| | | |
|---|---|---|
| 715,505 | Potter | Dec. 9, 1902 |
| 1,496,299 | Clifford | June 3, 1924 |
| 2,337,679 | Osterberg | Dec. 28, 1943 |
| 2,878,357 | Thomson et al. | Mar. 17, 1959 |